United States Patent [19]
Chang et al.

[11] Patent Number: 5,331,604
[45] Date of Patent: Jul. 19, 1994

[54] METHODS AND APPARATUS FOR DISCRETE-FREQUENCY TUBE-WAVE LOGGING OF BOREHOLES

[75] Inventors: Shu-Kong Chang, West Redding; Chaur-Jian Hsu, Danbury, both of Conn.

[73] Assignee: Schlumberger Technology Corporation, New York, N.Y.

[21] Appl. No.: 981,948

[22] Filed: Nov. 24, 1992

Related U.S. Application Data

[63] Continuation of Ser. No. 513,347, Apr. 20, 1990, abandoned.

[51] Int. Cl.$^5$ .................................................. G01V 1/40
[52] U.S. Cl. ............................................ 367/31; 367/32
[58] Field of Search ........................ 367/31, 32, 34, 25, 367/27, 28, 75, 48; 181/105, 106

[56] References Cited

U.S. PATENT DOCUMENTS

| | | | |
|---|---|---|---|
| 3,221,297 | 11/1965 | Smith et al. | 367/41 |
| 3,330,375 | 7/1967 | White | 367/28 |
| 3,881,168 | 4/1975 | Farr et al. | 367/32 |
| 4,004,267 | 1/1977 | Mayne | 367/60 |
| 4,131,875 | 12/1978 | Ingram | 367/35 |
| 4,419,748 | 12/1983 | Siegfried, II | 367/31 |
| 4,432,077 | 2/1984 | Alhilali et al. | 367/31 |
| 4,562,557 | 12/1985 | Parks et al. | 367/27 |
| 4,594,662 | 6/1986 | Devaney | 364/422 |
| 4,858,198 | 8/1989 | Weissman | 367/31 |
| 4,932,003 | 6/1990 | Winbow et al. | 367/75 |
| 5,077,697 | 12/1991 | Chang | 367/31 |

OTHER PUBLICATIONS

Kurkjian et al., "Acoustic multipole sources in fluid--filled boreholes", Geophysics, V. 51, #1, Jan. 1986.
"Full Wave Acoustic Logging," Minear et al., SPWLA 24th Annual Logging Symposium, Jun. 27-30, 1983.
J. E. White, Underground Sound, pp. 139-191, Elsevier, 1983.
D. M. Williams, J. Zemanek, F. A. Angona, C. L. Dennis, and R. L. Caldwell, The Long Spaced Acoustic Logging Tool (Transactions of the SPWLA 25th Annual Logging Symposium, Paper T, 1984).
O. Y. Liu, Stoneley Wave-Derived Δt Shear Log (Paper presented at the SPWLA Twenty-Fifth Annual Logging Symposium, Jun. 10-13, 1984).
K. Ellefsen et al, *Estimating Phase Velocity and Attenuation of Guided Waves from Acoustic Logging Data*, paper presented at the 57th Annual International SEG Meeting, New Orleans, pp. 665-667 (Oct. 15-17, 1987).
D. Schmitt, *Shear wave logging in elastic formations*, J. Acout. Soc. Am. 84 (6), Dec. 1988, pp. 2215-2229.

(List continued on next page.)

*Primary Examiner*—Ian J. Lobo
*Attorney, Agent, or Firm*—Bruce D. Riter; Leonard W. Pojunas

[57] ABSTRACT

The present invention offers methods and apparatus for low-frequency sonic borehole logging with tube waves using discrete frequency measurements. A source transducer emits sonic energy at a location in a borehole of at least one discrete frequency which induces propagation of tube waves in the borehole; sonic energy of the tube waves is received at multiple receiver locations in the borehole, the multiple receiver locations being spaced apart from one another and from the source transducer location; and at each said receiver location, the complex pressure response (amplitude and phase, or real and imaginary parts) of a receiver to the received sonic energy of the tube waves is detected relative to a phase reference. The detected complex pressure response may be processed to determine phase velocity of the tube waves in the borehole as a function of frequency, to determine attenuation of the tube waves in the borehole as a function of frequency and/or to determine attenuation and amplitude as functions of frequency. In addition, tube wave reflection coefficients near fractures, bed boundaries, etc., may be calculated. The tube wave data are useful for permeability correlation, fracture evaluation, rock rigidity studies and other purposes.

35 Claims, 4 Drawing Sheets

OTHER PUBLICATIONS

K. Ellefsen et al., *Estimate phase velocity and attenuation of guided waves in acoustic logging data*, Geophysics, vol. 54, No. 8 (Aug. 1989), pp. 1054–1059.

K. Hsu, A. Brie, and R. Plumb, A New Method for Fracture Identification Using Sonic Array Tools (Paper presented at the 1985 Annual Technical Conference and Exhibition of the Society of Petroleum Engineers of AIME, Sep. 22–25, 1985, publication No. SPE 14397).

J. L. Stevens and S. M. Day, Shear Velocity Logging in Slow Formations Using The Stoneley Wave (Borehole Geophysics Abstract No. BHG7 of the Extended Abstracts of the Annual Meeting of the Society of Exploration Geophysicists, Sep., 1983).

S. L. Marple, Jr., Digital Spectral Analysis, Prentice Hall, 1987, pp. 303–349.

Capon, Greenfield and Kolker, *Multidimensional Maximum Likelihood Processing of a Large Aperture Seismic Array*, 55 Proceedings of the IEEE, 1967, pp. 192–211.

G. Winbow, *A theoretical study of acoustic S-wave and P-wave velocity logging with conventional and dipole sources in soft formations*, Geophysics, vol. 53, No. 10 (Oct. 1988), pp. 1334–1342.

B. P. Lathi, Signals, Systems and Communication (1965), p. 111.

METHODS AND APPARATUS FOR DISCRETE-FREQUENCY TUBE-WAVE LOGGING OF BOREHOLES

This application is a continuation of application Ser. No. 07/513,347, filed Apr. 20, 1990, now abandoned.

BACKGROUND OF THE INVENTION

1. Field of the Invention

This invention relates to logging of low-frequency tube waves in boreholes, and more particularly to logging of tube waves propagated in boreholes by emission of sonic energy at discrete frequencies.

2. Description of Related Art

Emission of broad-band sonic energy in a fluid-filled tube, such as a mud-filled borehole in the earth, induces propagation of sonic waves in a number of modes. These modes include compressional, shear, and tube wave propagation.

Tube waves are a special type of surface waves. Surface waves were first postulated by Lord Rayleigh in 1885. Lord Rayleigh considered the case of a flat plane separating some solid elastic material from a vacuum, and found that the motion of the material near the plane executed a sort of elliptical motion as the surface wave passed. In 1924, R. Stoneley examined the related case in which a second solid is substituted for the vacuum, and discovered a new type of surface wave. In 1948, J. G. Scholte considered the special case when one of the materials was a fluid. The case considered by Scholte is the one of interest with respect to a fluid-filled borehole, although Stoneley's name is more commonly used in describing it.

If Scholte's plane is bent to form a cylinder, the geometry of the borehole is encountered. At very small wavelengths relative to a given borehole diameter, the cylinder will appear to the Stoneley wave as a flat plane. But with longer wavelengths, the Stoneley wave decays very little across the borehole. For example, at an operating frequency of, for example, 10 KHz, the wavelength in the mud is about 6 inches (comparable with a typical oilfield borehole diameter) and the wavelength in the formation surrounding the borehole may be as long as 2 feet. At the very low-frequency limit, the field strength of the Stoneley wave is practically flat across the borehole, since the borehole diameter is very small compared to a wavelength. Under these conditions the Stoneley wave is known as a tube wave. For purposes of the present invention and the disclosure given below, the terms "tube wave" and "Stoneley wave" will be considered synonymous.

Propagation of the tube wave up and down the borehole is believed to be affected by fluid communication between the borehole and the formation. Low-frequency tube waves have found a number of uses in borehole exploration, such as for determining formation permeability, evaluating formation fractures, and understanding rock rigidity and stress. Correlation between tube wave parameters (velocity and attenuation) and formation permeability has been reported in theory and from field data. See, for example, J. E. White, Underground Sound. pp. 139-191, Elsevier, 1983; and D. M. Williams, J. Zemanek, F. A. Angona, C. L. Dennis, and R. L. Caldwell, The Long Spaced Acoustic Logging Tool (Transactions of the SPWLA 25th Annual Logging Symposium, Paper T, 1984). The tube wave has also been used as a fracture indicator. See, for example, K. Hsu, A. Brie, and R. Plumb, A New Method for Fracture Identification Using Sonic Array Tools (Paper presented at the 1985 Annual Technical Conference and Exhibition of the Society of Petroleum Engineers of AIME, Sep. 22-25, 1985, publication no. SPE 14397). Use of tube wave information to derive the formation shear modulus is also known. See, for example, O. Y. Liu, Stoneley Wave-Derived $\Delta$t Shear Log (Paper presented at the SPWLA Twenty-Fifth Annual Logging Symposium, Jun. 10-13, 1984); and J. L. Stevens and S. M. Day, Shear Velocity Logging in Slow Formation Using the Stoneley Wave (Borehole Geophysics Abstract No. BHG7 of the Extended Abstracts of the Annual Meeting of the Society of Exploration Geophysicists, September, 1983).

Traditionally, sonic logging measurements are made in the time domain: a broad-band sonic energy source excites propagation of sonic waves in the borehole, and waveforms detected at an array of receiver locations spaced from the source in the borehole are recorded as functions of time. See, for example, D. M. Williams, J. Zemanek, F. A. Angona, C. L. Dennis, and R. L. Caldwell, The Long Spaced Acoustic Logging Tool (Transactions of the SPWLA 25th Annual Logging Symposium, Paper T, 1984). Tube wave velocity and reflection coefficients at the dominant tube wave frequency can be estimated by waveform stacking techniques, such as semblance or radon transforms.

However, quantitative interpretation and applications of the tube wave data require information about the tube waves in the frequency domain. That is, information such as tube wave velocity dispersion, tube wave attenuation and tube wave reflection coefficients are needed as functions of frequency. To obtain the frequency-dependent information, waveforms recorded in the time domain are transformed into the frequency domain before processing.

Time domain recording has several disadvantages if the frequency domain results are desired. The waveforms must be sampled in small time steps over a long period, resulting in a large set of data to transmit, store, and process. The truncation in time can cause interference in the processing. Also, the signal-to-noise ratio can be quite small for the wide-band transient measurements. The noise problem can be significant for low-frequency data (less than 500 Hz) because of the noises generated by the sonde traveling in the borehole. These problems may be avoided in accordance with the present invention by taking measurements in frequency domain.

U.S. Pat. No. 3,330,375, issued Jul. 11, 1967 to J. E. White proposes a form of acoustic well logging in which the propagation velocities of compressional, shear, mud and casing waves are determined from the expression velocity=frequency×wavelength by employing transmitter and/or receiver tuning techniques to determine the wavelength for a known frequency. A variety of such techniques are disclosed, involving wavelength tuning by varying frequency and/or phase shift. In all the techniques, frequency and/or phase shift is adjusted until an amplitude peak is observed, the frequencies which produce such amplitude peaks are noted, and wave propagation velocity is calculated from the expression given above. In one such technique, the wavelength of the transmitted signal is tuned to a fixed wavelength of the sending and receiving arrays by varying its frequency. In another, the wavelength of the arrays is tuned to a fixed value of the transmitted wavelength by varying the phase shift between adjacent transducer elements. In another, the frequency of the transmitted signal or the phase shift between adjacent receiving transducers, or both, are varied.

The technique of U.S. Pat. No. 3,330,375, although not directed to tube wave logging, would have the disadvantage if used for tube wave logging that insufficient information is gathered to permit derivation of both tube wave velocity and tube wave attenuation as functions of frequency. Furthermore, the disclosed method requires downhole tuning of the frequency and/or the wavelength while acquiring the data. The method is not directly applicable to obtain the frequency dependent characteristics of dispersive waves, such as the tube wave in a borehole.

In another approach, U.S. Pat. No. 4,419,748, issued Dec. 6, 1983 to R. W. Siegfried, II., proposes a continuous wave sonic logging method in which a continuous sine wave at a single frequency is emitted and received, and a spatial Fourier transform is performed over the receiver array. The resulting spatial frequency component are then used to indicate the velocities of various sonic paths. The logging method of U.S. Pat. No. 4,419,748 would have several disadvantages for tube wave logging. For example, the method requires a large number of receivers in order to facilitate the spatial Fourier transforms. Further, the disclosed method records the instantaneous values of the received signal; that is, it is recorded in time domain. Therefore, the measurement is subject to noise interferences. No improvement in the signal to noise ratio is realized by the proposed method. Furthermore, the measurement can only be done one frequency at a time (due to the time domain recording). This would require numerous logging runs for the dispersive waves, for which the wave characteristics are functions of frequency. Since the logging time is a costly factor in wire line logging services, the method is not practical for logging dispersive waves.

It is an object of the present invention to provide methods and apparatus for borehole logging with tube waves in which the aforementioned disadvantages of time-domain recording are avoided.

It is a further object of the present invention to provide methods and apparatus for borehole logging with tube waves in which the complex pressure response (amplitude and phase, or real and imaginary parts) of tube waves propagated in the borehole is detected for use in determining parameters such as tube wave phase velocity and tube wave attenuation as functions of frequency.

SUMMARY OF THE INVENTION

The present invention offers methods and apparatus for low-frequency sonic borehole logging with tube waves using discrete frequency measurements. In a preferred form of the invention a source transducer emits sonic energy at a location in a borehole of at least one discrete frequency which induces propagation of tube waves in the borehole; sonic energy of the tube waves is received at multiple receiver locations in the borehole, the multiple receiver locations being spaced apart from one another and from the source transducer location; and for each said receiver location, the complex pressure response of the received sonic energy of the tube waves is detected relative to a phase reference. The source transducer may be driven continuously at one or a plurality of discrete frequencies, or may be driven intermittently, or may be driven alternately from a plurality of sources which provide one or a plurality of discrete frequencies. In one preferred form, the source transducer is driven from a square-wave signal source to emit sonic energy at a plurality of discrete frequencies. The phase reference is preferably derived from the same signal source which drives the source transducer.

The detected complex pressure response (amplitude and phase, or real and imaginary parts) of the received sonic energy of the tube waves may be processed to determine phase velocity of the tube waves in the borehole as a function of frequency, to determine attenuation of the tube waves in the borehole as a function of frequency and/or to determine attenuation and amplitude as functions of frequency. In addition, tube wave reflection coefficients near fractures, bed boundaries, etc., can be calculated. The tube wave data are useful for permeability correlation, fracture evaluation, rock rigidity studies and other purposes. A number of different techniques may be used to process the tube wave data. Among these are: three receiver analytical solutions, least square fittings, two receiver phase difference and amplitude ratio, Prony's method, wave impedance methods and wall impedance methods.

DETAILED DESCRIPTION OF THE INVENTION

Figure 1:
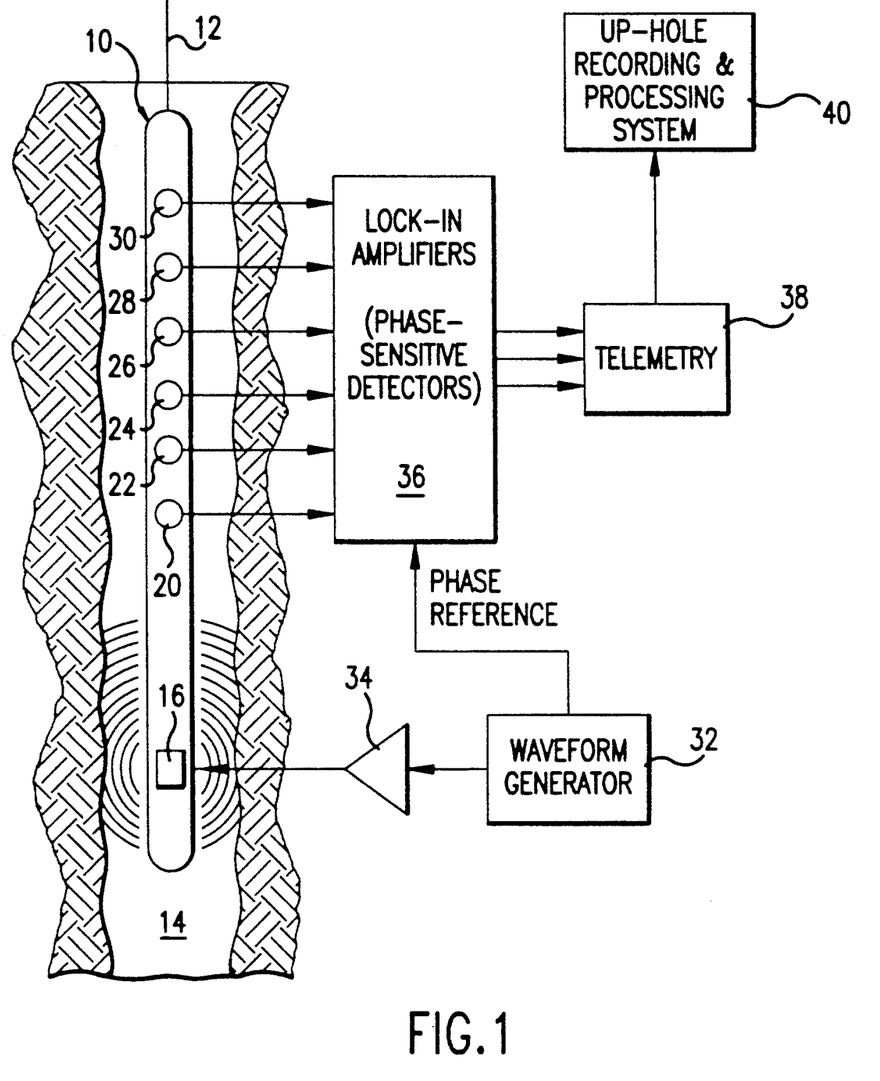
FIG. 1 shows in schematic block form a first preferred embodiment of a discrete-frequency tube-wave logging apparatus in accordance with the invention.

FIG. 1 shows in schematic block form a first preferred embodiment of a logging apparatus in accordance with the present invention, useful for recording tube-wave data at discrete frequencies. Referring to FIG. 1, acoustic logging sonde 10 is shown suspended by cable 12 in borehole 14 in the earth. Borehole 14 is filled with drilling mud or other fluids (not illustrated). Logging sonde 10 includes a sending, or source, transducer 16 and a plurality of receiving transducers 20–30 arrayed at locations spaced apart from one another and from sending transducer 16 along sonde 10. While FIG. 1 shows six receiving transducers, it will be appreciated that any number may be used.

Narrow-band waveform generator 32 generates sinusoidal signals at one or more discrete frequencies, the signals being passed through power amplifier 34 to drive sending transducer 16. The signals may be continuous, or may be transmitted in bursts of sufficient duration (for example, on the order of 10 to 20 cycles per burst) to approximate a continuous wave for purposes of exciting propagation of tube waves in the borehole at the desired frequency or frequencies. When so driven, sending transducer 16 emits sonic waves in the borehole at the prescribed frequencies. The sonic waves propagate in the borehole and are received at receiving transducers 20-30. The signal output from each of receiving transducers 20-30 is supplied to a respective lock-in amplifier which detects the complex pressure response (amplitude and phase, or real and imaginary parts) of the received waves at the frequencies of generator 32. The lock-in amplifiers (shown collectively at 36) also receive phase reference signals from generator 32. The phase reference signals are preferably the signals generated by generator 32 for driving sending transducer 16. Data detected by lock-in amplifiers 32 is passed to conventional telemetry circuitry 36 for transmission to an up-hole system for recording and processing the data. Generator 32, power amplifier 34, lock-in amplifiers 36 and telemetry circuitry 38 are preferably built into sonde 10. Telemetry circuitry 38 preferably transmits data output from lock-in amplifiers 36 to the up-hole recording and processing system 40 via cable 12 or any other suitable means.

Sending transducer 16 may be any conventional type of monopole pressure wave source comprising, for example, one or more piezoelectric ceramic transducers, magnetostrictive transducers, or electrodynamic vibrators. Sending transducer 16 may be driven in any manner suitable for exciting propagation of tube waves in the borehole at one or more discrete frequencies, only some of which will be described herein. Receiving transducers 20-30 are of any type suitable for detecting pressure waves, such as hydrophones.

Figure 2:
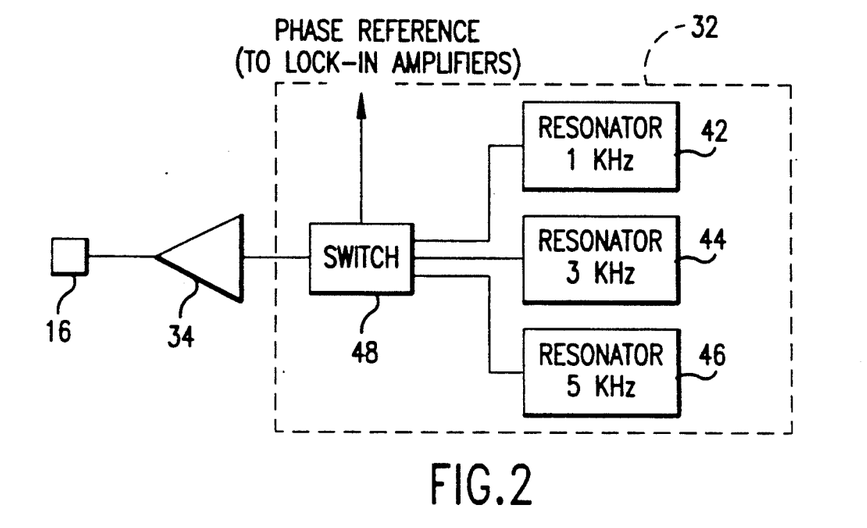
FIG. 2 shows in schematic block form a modification of the embodiment of FIG. 1 which permits multiple, discrete frequencies to be emitted sequentially in bursts for tube-wave logging in accordance with the invention.

FIG. 2 shows in schematic block form one embodiment of waveform generator 32 of FIG. 1, which permits multiple, discrete frequencies to be emitted in sequential bursts for tube-wave logging in accordance with the invention. A plurality of resonators, for example three resonators 42, 44 and 46, generate sinusoidal signals at respective frequencies suitable for exciting tube waves in the borehole, for example at frequencies of 1 KHz 3 KHz and 5 KHz. Suitable switching means 48 alternately passes multi-cycle bursts of the respective frequencies to power amplifier 34 to drive transducer 16 and to lock-in amplifiers 36 for use as a phase reference. The multi-cycle bursts are of sufficient length (for example, 10 to 20 cycles) to effectively simulate a continuous signal for purposes of exciting tube wave propagation in the borehole at the selected frequencies.

Figure 3:
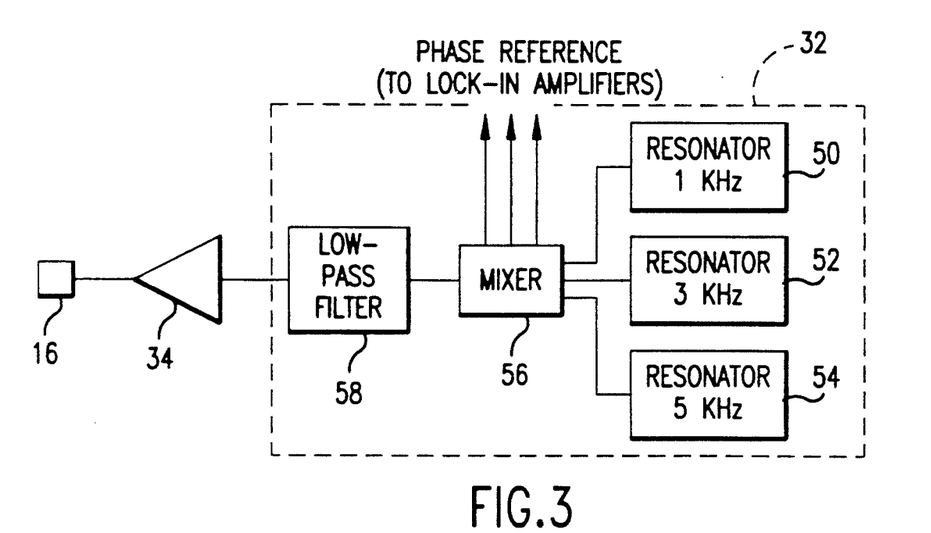
FIG. 3 shows in schematic block form a further modification of the embodiment of FIG. 1 which permits multiple, discrete frequencies to be emitted simultaneously for tube-wave logging in accordance with the invention.

FIG. 3 shows in schematic block form another embodiment of waveform generator 32 of FIG. 1 which permits multiple, discrete frequencies to be emitted simultaneously for tube-wave logging in accordance with the invention. A plurality of resonators, for example three resonators 50, 52 and 54, generate sinusoidal signals at respective frequencies. The signals are supplied to mixer 56 which produces multiple frequencies suitable for exciting tube waves in the borehole, for example at frequencies of, for example 1 KHz, 3 KHz and 5 KHz. The multiple-discrete-frequency output of mixer 56 is passed through low-pass filter 58 to remove higher-frequency harmonics, and then through power amplifier 34 to drive sending transducer 16. Mixer 56 also supplies a phase-reference signal for each frequency to a lock-in amplifier. In this case, a lock-in amplifier is provided for each receiving transducer for each frequency. With the embodiment of FIG. 3, the complex pressure response (phase and amplitude, or real and imaginary parts) of the received tube waves may be detected simultaneously for a plurality of discrete frequencies.

In yet another embodiment, the waveform generator 32 of FIG. 1 drives the source transducer or transducers at a desired set of frequencies by using a repetitive signal sequence. If the period of the sequence is $\tau$, then a discrete frequency spectrum at $f=n/\tau$ is obtained, where $n=1, 2, 3$, etc. The amplitude distribution for the frequencies of interest can be designed by the shape of the waveform of the sequence. In other words, the shape of the waveform can be designed such that a desired discrete frequency spectrum is obtained. This may be achieved by first specifying the amplitude distribution for the discrete frequencies, and then by summing the Fourier series of all the discrete frequency terms with the pre-assigned amplitude distribution.

Figure 4:
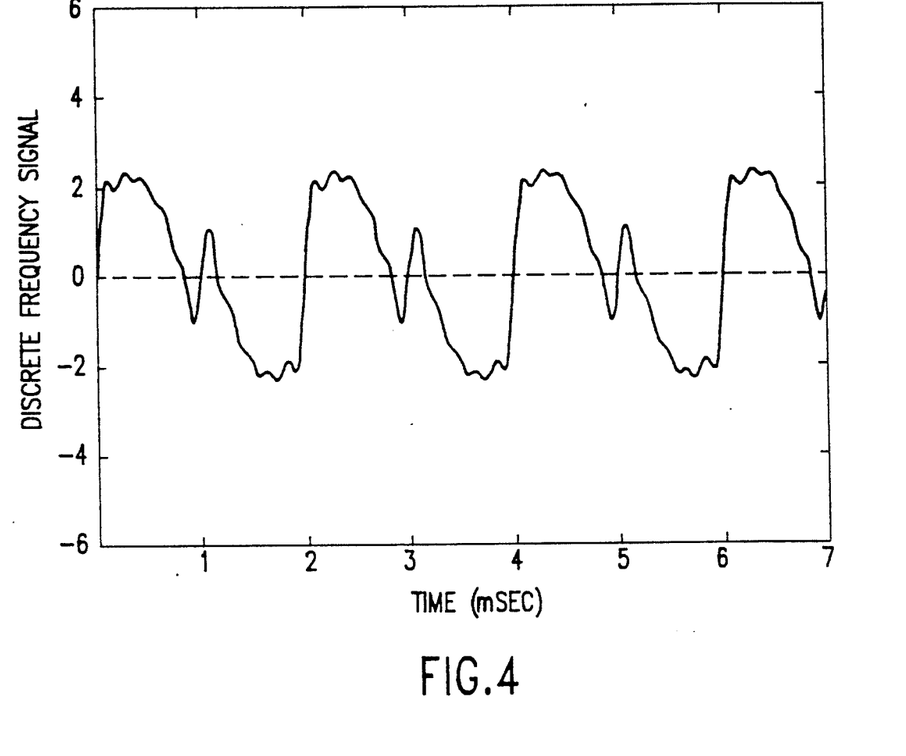
FIG. 4 shows amplitude of a periodic signal as a function of time, the signal having a discrete-frequency spectrum as shown in FIG. 5.
Figure 5:
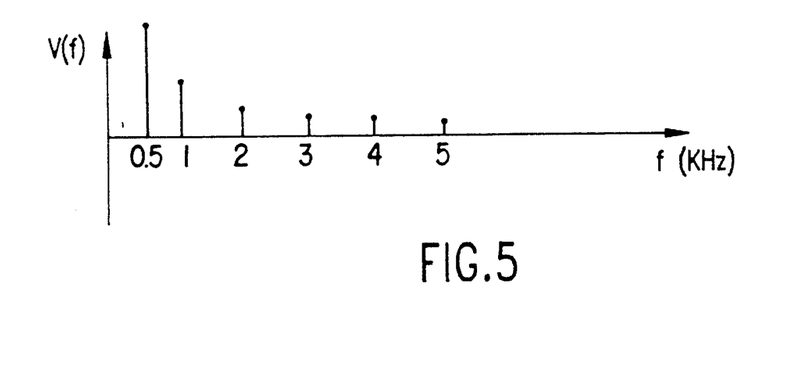
FIG. 5 shows amplitude of the discrete frequencies of the signal of FIG. 4 as a function of frequency.

One example of such a repetitive signal sequence is given if FIG. 4, which shows the amplitude of a periodic signal as a function of time. This periodic signal has a discrete frequency spectrum at $f_n=0.5, 1, 2, 3, 4, 5$ kilohertz. The Fourier amplitude for each frequency is inversely proportional to $f_n$. Thus, the Fourier spectrum of the signal of FIG. 4 is as shown in FIG. 5. For purposes of the present invention, the Fourier spectrum of the signal preferably has much higher energy in its lower frequency components than in its higher frequency components. This is because the upper frequency boundary for the energy of tube waves propagating in a borehole is about 5 kHz for boreholes of a diameter typically encountered in oilfield well logging. (It will be recalled that this upper frequency boundary is dependent on borehole diameter and the formation surrounding the borehole.) Greater energy at the low-frequency end of the spectrum will thus provide greater signal-to-noise ratio of the tube waves. Selecting minimum and maximum frequencies of $f_{min}$ and $f_{max}$, respectively, then the square wave signal may be chosen such that $\tau=1/f_{min}$, if every $f_n$ is an integer multiple of the minimum frequency, $f_{min}$.

and $N \approx f_{max}\tau$

A low-pass filter can be applied to the periodic signal to eliminate the harmonics above $f_{max}$. Other (e.g., square-wave, saw-tooth, specially-designed pulse shape, etc.) periodic signals may also be used for exciting discrete frequency signals.

Figure 6:
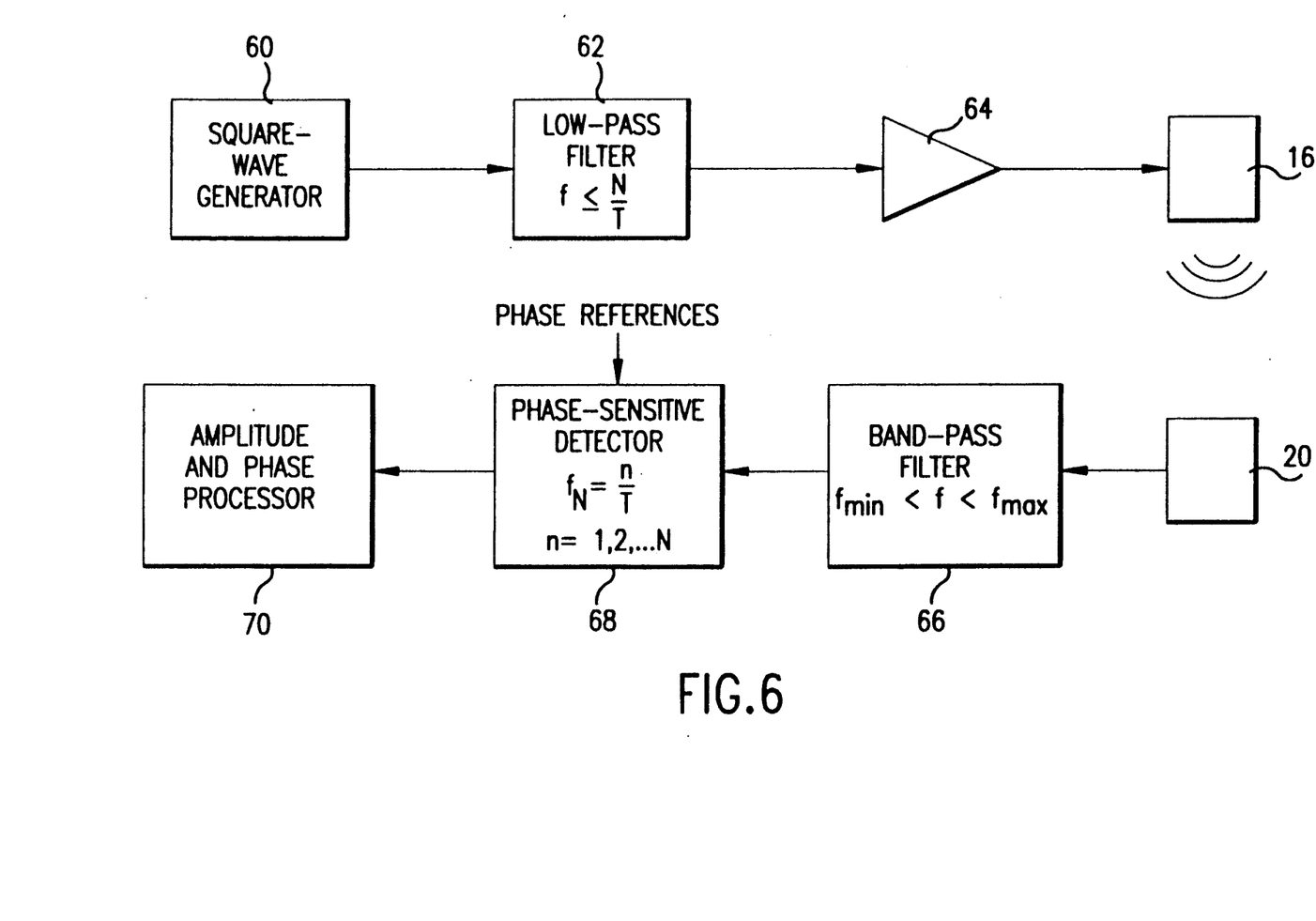
FIG. 6 shows in schematic block form a further modification of the embodiment of FIG. 1 which permits multiple, discrete frequencies to be emitted simultaneously for tube-wave logging in accordance with the invention.

FIG. 6 shows still another embodiment of the waveform generator 32 of FIG. 1 which permits multiple, discrete frequencies to be emitted simultaneously for tube-wave logging in accordance with the invention. Referring now to FIG. 6, the output signal from square-wave generator 60 is supplied to low-pass filter 62 which passes frequencies $f \leq N/\tau$. The filtered signal is then passed through power amplifier 64 to drive sending transducer 16. The emitted sonic energy from sending transducer 16 excites tube wave propagation in the borehole and the tube waves are received at each of the receiving transducers, only one of which is shown (at 20). The output signal from each of the receiving transducers is passed through a respective band pass filter (one of which is shown at 66) having a pass-band frequency characteristic $f_{min} < f < f_{max}$. The filtered signal is then supplied to the input of a phase-sensitive detector circuit (one of which is shown at 68) which detects the phase of each frequency component of the filtered signal relative to a respective phase reference signal, as well as the amplitude of each frequency component. The phase reference signals may be obtained from the circuitry which drives sending transducer 16. Phase-sensitive detector 68 may be of any suitable analog, digital or hybrid construction. The phase and amplitude data for each frequency is passed by suitable means (for example, telemetry to an up-hole site) from phase-sensitive detector 68 to processor 70 which makes use of the data for any of a number of purposes, some of which are described below. Those of skill in the art will recognize that suitable modification of the detection circuitry will permit detection of the real and imaginary parts of the complex pressure response of the receiving transducer, rather than the amplitude and phase of the complex pressure response.

As noted above, the upper frequency boundary for the energy of tube waves propagating in a borehole is about 5 KHz for boreholes of a diameter typically encountered in oilfield well logging. This upper frequency boundary is dependent on borehole diameter and the formation surrounding the borehole. Thus, the discrete frequencies at which tube waves are to be excited in the borehole preferably includes a number of discrete frequencies up to the upper frequency boundary, for example, 1 kHz, 2 kHz, 3 kHz, 4 kHz and 5 kHz. Spacing of the receiving transducers is not critical, but is preferably such that the length of the receiving transducer array is not substantially less than the wavelength of the tube wave energy in order to accurately determine the tube wave phase velocity.

Measuring tube waves in frequency domain offers several advantages. For example, measurements in frequency domain give higher signal-to-noise ratio than do time domain measurements. This is because the signal-to-noise ratio is inversely proportional to the bandwidth of the signal, and the bandwidth of the signal can be made extremely narrow when working with discrete frequencies. Also, as the present invention records the complex pressure response (amplitude and phase, or real and imaginary parts) of the detected tube wave energy for discrete frequencies, the quantity of data recorded is less than that of time-domain logging techniques where full waveforms are recorded. This has at least two advantages. First, as the quantity of data to be transferred uphole is substantially reduced, the logging speed can be increased. Second, it may be possible to store all data in the sonde until logging is complete, thereby also increasing logging speed and efficiency. Further, as there is no need to transform the waveforms from time domain to frequency domain, the processing is simplified. In addition, transducer calibration at specific frequencies is more reliable than is transducer calibration for the broad-band time domain sondes. These features are believed to make the frequency domain logging methods and apparatus of the present invention more accurate than traditional time-domain sonic logging for obtaining the frequency-dependent information of tube waves.

The data obtained with the methods and apparatus of the present invention are the amplitude and phase (or real and imaginary parts) of the tube wave signal at each receiver for each frequency. In the following, selected prior art processing techniques are described which may be used to extract information from the measured data. Other processing techniques may also be employed.

1. Two Receiver Technique

As a tube wave travels in the borehole in one direction, the pressure function can be expressed in the following form:

$$P(z,f) = A(f) e^{-\alpha z} e^{j2\pi(f/v)z} \quad (1)$$

where P is the pressure; A is the amplitude function which is independent of transmitter-receiver spacings; z is the transmitter-receiver spacing; f is the frequency; v is the tube wave phase velocity; and $\alpha$ is the attenuation constant.

If the complex pressure function is measured at two receiver locations, $z_1$ and $z_2$, the tube wave velocity and attenuation constant may be calculated according to the following formulas:

$$v(f) = [\text{phase}(P(z_1,f)) - \text{phase}(P(z_2,f))]/2\pi f(z_1 - z_2) \quad (2a)$$

$$\alpha = \ln[\text{abs}(P(z_2,f)/P(z_1,f))]/(z_1 - z_2) \quad (2b)$$

The two receiver method has one constraint; the tube wave must travel in only one direction. If there are significant reflection signals from tool housing structure, bed boundaries, or fractures, then other processing procedures should be used which can include both forward and backward traveling waves.

2. Three Receiver Technique

Tube waves can be reflected, either by the borehole/formation inhomogeneity or by the sonde housing structure. With the tube wave traveling up and down the borehole, the pressure function can be expressed as:

$$P(z,t) = A\, e^{ikz} + B\, e^{-ikz} \quad (3a)$$

where k is the complex wave-number of the tube wave.

$$k = 2\pi(f/v) + i\alpha \quad (3b)$$

If $P_n$ is defined as the complex pressure response of the n-th receiver located at $z_n$, and if the receivers are equally spaced at interval of $\Delta z$, then Equation (3a) can be rewritten as $$P_n = A\, e^{ikz_n} + B\, e^{-ikz_n} \quad (4)$$

Taking the data from only three receivers, and defining $A' = A\, e^{ikz_2}$, $B' = B\, e^{-ikz_2}$ and $G = e^{ik\Delta z}$, then the following equations result:

$$P_1 = A'G^{-1} + B'G \quad (5a)$$

$$P_2 = A' + B' \quad (5b)$$

$$P_3 = A'G + B'G^{-1} \quad (5c)$$

Eliminating $A'$ and $B'$, Equations (5a)–(5c) can be reduced to a quadratic equation of G. The solution of the quadratic equation is $$G = \frac{(P_1 + P_3) \pm \sqrt{(P_1 + P_3)^2 - 4P_2^2}}{2P_2} \quad (6)$$

Once G is solved, k can be obtained from the expression $k = (\ln G)/(i\Delta z)$.

The tube wave phase velocity, v, and the tube wave attenuation constant, $\alpha$, can then be calculated from Equation (3b). Solving for A' and B' from Equations (5a), (5b) and (5c), the following expressions are obtained:

$$A' = \frac{P_2 - P_3 G}{1 - G^2} \quad (7a)$$

$$B' = P_1 - A' \quad (7b)$$

The tube wave reflection coefficient can be obtained from the ratio of B' and A' with proper exponential factors.

3. Array Techniques

Any of a number of known techniques may be used to process data from an array of receivers, such as: least square method, Prony's method, maximum likelihood method, and others.

In the least square method, A and B and k are found such that $$R = \sum_{n=1}^{n=N} [\text{abs}(P_n - Ae^{ikz_n} - Be^{-ikz_n})]^2 \quad (8)$$

is minimized. Here, the total number of receivers in the array is N. The least square method is preferable if the tube wave is the only arrival at the receivers (so that Equation (4) is valid). If there are other arrivals, such as compressional, fluid and other waves, then other spectral estimation techniques (Prony's method, maximum likelihood method, etc.) are preferred.

In applying Prony's method, the receiver pressure at a fixed frequency is first assumed to be $$P(z) = \sum_{m=1}^{p} A_m e^{ik_m z} \quad (9)$$

A linear predictor is defined as h(z) so as to satisfy the relationship $$P(z) \circledZ h(z) = 0 \quad (10)$$

where the notation, $\circledZ$, means convolution in z. If H(k) is the Fourier transform of h(z) in the wave-number domain, Equations (9) and (10) can be satisfied only when H(k) is zero at $k = k_m$.

In Prony's method, the spatial variables P(z) and h(z) are first truncated to finite intervals of z. The linear equations of Equation (10) are then used to solve for h(z) (assuming h(0)=1). The function h(z) is Fourier-transformed to H(k). Solving the k's for the equation H(k)=0, the estimates of $k_m$'s are obtained. The tube wave phase velocity and attenuation are then obtained from the $k_m$'s according to Equation (3b). The amplitude functions $A_m$'s can also be estimated by least square fitting. (This is different from the least square method described above. Here, the calculated values of $k_m$ are used in the fitting.)

Further information on Prony's method may be found, for example, at S. L. Marple, Jr., *Digital Spectral Analysis*, Prentice Hall, 1987 (incorporated herein by this reference for all purposes), at pages 303–349.

In the maximum likelihood method, the function L(k) is first calculated as $$L(k) = \frac{[G^*(k)(R^{-1})^*G(k)]}{\text{abs}[G^*(k)R^{-1}G(k)]^2} \quad (11)$$

where $$G(k) = \begin{bmatrix} e^{ikz_1} \\ \cdot \\ \cdot \\ \cdot \\ e^{ikz_N} \end{bmatrix};$$

and $$R = \begin{bmatrix} P_1 \\ \cdot \\ \cdot \\ \cdot \\ P_N \end{bmatrix} \begin{bmatrix} P_1 \\ \cdot \\ \cdot \\ \cdot \\ P_N \end{bmatrix}^*$$

The superscript * denotes conjugate transpose of the matrix or the vector. The values of $k_m$ are obtained by searching for the locations of the local minimum of L(k). Further information on the maximum likelihood method may be found in Capon, Greenfield and Kolker, *Multidimensional Maximum Likelihood Processing of a Large Aperture Seismic Array*, 55 Proceedings of the IEEE, 1967 (incorporated herein by this reference for all purposes), at page 192–211.

Tube wave measurements made in the frequency domain in accordance with the present invention have several applications. For example, the velocity and attenuation values may be correlated to the fluid flow permeability of the rock formations; the reflection coefficient may be used to evaluate fracture parameters such as permeability, height, depth, etc.; and/or the wave impedance and wall impedance may be used to obtain fracture parameters and permeability. In addition, tube wave data as functions of frequency can be related to formation rock rigidity, as well as borehole alteration (caused by stress release or other factors); and accurate tube wave measurements are useful for improving VSP processing and interpretation.

The preferred embodiments described above are not intended to be limiting, but are instead intended as merely illustrative of the present invention. Those of skill in the art will recognize that many modifications may be made in the disclosed embodiments without departing from the spirit and scope of the present invention as defined by the following claims.

We claim:

1. A method of borehole logging, comprising the steps of:
   (a) emitting from a monopole source a repeating signal sequence of sonic energy at a first location in a borehole which induces propagation of tube waves in said borehole, said sonic energy being concentrated at a plurality of selected discrete frequencies separated by frequency bands containing substantially no sonic energy;
   (b) receiving sonic energy of said tube waves induced in response to the repeating signal sequence at multiple receiver locations in said borehole, said multiple receiver locations being spaced apart from one another and from said first location; and (c) for each said receiver location, detecting a complex pressure response of the received sonic energy of said tube waves by directly measuring said tube waves in the frequency domain.

2. The method of claim 1, wherein step (a) comprises repetitively emitting said repeating signal sequence of sonic energy, with said sonic energy being concentrated at a plurality of selected discrete frequencies below 6 kHz.

3. The method of claim 1, further comprising the step of deriving a respective phase reference from said emitted repeating signal sequence of sonic energy for each of said plurality of selected discrete frequencies, and wherein said step of detecting a complex pressure response of the received sonic energy of said tube waves comprises the step of detecting said complex pressure response of the received sonic energy of said tube waves for each of said plurality of selected discrete frequencies in relation to the respective phase reference.

4. The method of claim 3, further comprising the step of processing said detected complex pressure response to determine phase velocity of said tube waves in said borehole.

5. The method of claim 1, further comprising the step of processing said detected complex pressure response to determine attenuation of said tube waves in said borehole.

6. A method of borehole logging, comprising the steps of:

(a) emitting sonic energy at a first location in a borehole of at least one discrete frequency which induces propagation of tube waves in said borehole;

(b) receiving sonic energy of said tube waves at multiple receiver locations in said borehole, said multiple receiver locations being spaced apart from one another and from said first location;

(c) for each said receiver location, detecting a complex pressure response of the received sonic energy of said tube waves; and (d) calculating tube wave phase velocity v and tube wave attenuation constant $\alpha$ from said detected complex pressure response at two of said receiver locations and from the expressions:

$$v(f)^{-1} = [\text{phase}(P(z_1, f)) - \text{phase}(P(z_2, f))]/2\pi f(z_1 - z_2)$$

$$\alpha = \ln\,[\text{abs}(P(z_2, f)/P(z_1, f))]/(z_1 - z_2)$$

where the tube wave pressure function is expressed as:

$$P(z,f) = A(f) e^{-\alpha z} e^{j2\pi(f/v)z}$$

and where P is pressure; A is amplitude as a function of frequency and is independent of spacing between said emitting location and said receiver locations; z is the spacing between said emitting location and a receiver location; f is the discrete frequency at which the tube wave energy is propagated; and $z_1$ and $z_2$ are respective said receiver locations.

7. A method of borehole logging, comprising the steps of:

(a) emitting sonic energy at a first location in a borehole of at least one discrete frequency which induces propagation of tube waves in said borehole;

(b) receiving sonic energy of said tube waves at multiple receiver locations in said borehole, said multiple receiver locations being spaced apart from one another and from said first location;

(c) for each said receiver location, detecting a complex pressure response of the received sonic energy of said tube waves; and (d) calculating tube wave phase velocity v and tube wave attenuation constant $\alpha$ from said detected complex pressure response at three of said receiver locations equally spaced at intervals $\Delta z$ and from the expression:

$$k = 2\pi(f/v) + i\alpha = (\ln G)/(i\Delta z)$$

where $$G = \frac{(P_1 + P_3) \pm \sqrt{(P_1 + P_3)^2 - 4P_2^2}}{2P_2}$$

and where k is the complex wave-number of the received tube wave, f is the frequency of the received tube wave, and $P_n$ is the complex pressure response of the receiver located at an n-th one of said receiving locations.

8. The method of claim 7, further comprising the step of calculating a tube wave reflection coefficient from the ratio of B and A in which $$A = \frac{P_2 - P_3 G}{1 - G^2}$$

$$B = P_1 - A.$$

9. A method of borehole logging, comprising the steps of:

(a) emitting sonic energy at a first location in a borehole of at least one discrete frequency which induces propagation of tube waves in said borehole;

(b) receiving sonic energy of said tube waves at multiple receiver locations in said borehole, said multiple receiver locations being spaced apart from one another and from said first location;

(c) for each said receiver location, detecting a complex pressure response of the received sonic energy of said tube waves; and (d) determining values for a variable A and a variable B and a variable k such that the expression:

$$R = \sum_{n=1}^{n=N} [\text{abs}(P_n - Ae^{ikz_n} - Be^{-ikz_n})]^2$$

is minimized and where N is a plural number of said receiver locations, k is the complex wave-number of the received tube wave, $z_n$ is an n-th one of said receiving locations, and $P_n$ is the complex pressure response of the receiver located at $z_n$ and is expressed as:

$$P_n = A\,e^{ikz_n} + B\,e^{-ikz_n}.$$

10. The method of claim 9, further comprising the step of calculating the tube wave reflection coefficient from the ratio of said determined values for A and B.

11. The method of claim 9, further comprising the step of calculating the tube wave phase velocity v from the expression:

$$k = 2\pi(f/v) + i\alpha.$$

12. The method of claim 9, further comprising the step of calculating the tube wave attenuation constant $\alpha$ from the expression:

$$k = 2\pi(f/v) + i\alpha.$$

13. A method of borehole logging, comprising the steps of:
   (a) emitting sonic energy at a first location in a borehole of at least one discrete frequency which induces propagation of tube waves in said borehole;
   (b) receiving sonic energy of said tube waves at multiple receiver locations in said borehole, said multiple receiver locations being spaced apart from one another and from said first location;
   (c) for each said receiver location, detecting a complex pressure response of the received sonic energy of said tube waves;
   (d) defining the detected complex pressure response P(z) at a fixed frequency to be $$P(z) = \sum_{m=1}^{p} A_m e^{ik_m z};$$

(e) defining a linear predictor h(z) so as to satisfy the relationship $$P(z) \circledZ h(z) = 0$$

where the notation, $\circledZ$, means convolution in z;
   (f) defining H(k) as the Fourier transform of h(z) in the wave-number domain, where said definitions of receiver pressure P(z) and said linear predictor h(z) can be satisfied only when H(k) is zero at $k = k_m$;
   (g) truncating spatial variables P(z) and h(z) to finite intervals of z;
   (h) solving the linear equations of the relationship $$P(z) \circledZ h(z) = 0$$

for h(z), assuming h(0) = 1;
   (i) transforming the function h(z) to H(k); and
   (j) calculating values of k for the equation H(k) = 0 to obtain estimated values for $k_m$.

14. The method of claim 13, further comprising the step of calculating the tube wave phase velocity and tube wave attenuation from said values for $k_m$ from the relationship $$k = 2\pi(f/v) + i\alpha.$$

15. The method of claim 13, further comprising the step of estimating said amplitude functions $A_m$ by least square fitting.

16. A method of borehole logging, comprising the steps of:
   (a) emitting sonic energy at a first location in a borehole of at least one discrete frequency which induces propagation of tube waves in said borehole;
   (b) receiving sonic energy of said tube waves at multiple receiver locations in said borehole, said multiple receiver locations being spaced apart from one another and from said first location;
   (c) for each said receiver location, detecting a complex pressure response of the received sonic energy of said tube waves;
   (d) calculating the function L(k) as $$L(k) = \frac{[G^*(k)(R^{-1})^*G(k)]}{\text{abs}[G^*(k)R^{-1}G(k)]^2}$$

where $$G(k) = \begin{bmatrix} e^{ikz1} \\ \cdot \\ \cdot \\ \cdot \\ e^{ikzN} \end{bmatrix};$$

and $$R = \begin{bmatrix} P_1 \\ \cdot \\ \cdot \\ P_N \end{bmatrix} \begin{bmatrix} P_1 \\ \cdot \\ \cdot \\ P_N \end{bmatrix}^*$$

and where $P_n$ is the complex pressure response of the receiver located at $z_n$, N is the number of receivers in the array, and the superscript * denotes conjugate transpose of the matrix or the vector; and
   (e) determining values of $k_m$ by searching for the locations of the local minimum of L(k).

17. A method of logging tube waves with a tube wave logging tool in a borehole traversing an earth formation, comprising the steps of:
   emitting from a monopole source a repeating signal sequence of sonic energy at a first location to induce propagation of tube waves in said borehole, said sonic energy being concentrated at a plurality of selected discrete frequencies separated by frequency bands containing substantially no sonic energy;
   receiving at a second and a third location sonic energy of said tube waves induced in response to the repeating signal sequence;
   for each of said plurality of frequencies, determining amplitude and phase of the sonic energy received at said second and third locations by directly measuring said tube waves in the frequency domain; and
   transmitting from the borehole signals representing the determined amplitude and phase of the sonic energy received at said second and third locations.

18. The method of claim 17, further comprising the step of deriving a respective phase reference from said emitted repeating signal sequence of sonic energy for each of said plurality of selected discrete frequencies, and wherein said step of determining amplitude and phase of said sonic energy received at said second and third locations comprises the step of determining, for each of said plurality of selected discrete frequencies, phase of said sonic energy received at said second and third locations in relation to the respective phase reference.

19. Apparatus for borehole logging, comprising:

(a) means for emitting from a monopole source a repeating signal sequence of sonic energy at a first location in a borehole which induces propagation of tube waves in the borehole, said sonic energy being concentrated at a plurality of selected discrete frequencies separated by frequency bands containing substantially no sonic energy;

(b) means for receiving sonic energy of said tube waves induced in response to the repeating signal sequence at multiple receiver locations in said borehole, said multiple receiver locations being spaced apart from one another and from said first location; and (c) means for detecting, for each said receiver location, a complex pressure response of the received sonic energy of said tube waves by directly measuring said tube waves in the frequency domain.

20. The apparatus of claim 19, wherein said emitting means comprises a source transducer and means for driving said source transducer with a repetitive signal such that said source transducer emits a repeating signal sequence of sonic energy, with said sonic energy being concentrated at a plurality of selected discrete frequencies below 6 kHz.

21. The apparatus of claim 19, further comprising means for supplying a respective phase reference to said detecting means for each of said plurality of selected discrete frequencies, and wherein said detecting means comprises means for detecting for each of said plurality of selected discrete frequencies a complex pressure response of the received sonic energy of said tube waves in relation to the respective phase reference.

22. The apparatus of claim 19, further comprising means for processing said detected complex pressure response to determine propagation velocity of said tube waves in said borehole.

23. The apparatus of claim 19, further comprising means for processing said detected complex pressure response to determine attenuation of said tube waves in said borehole.

24. A method of borehole logging, comprising the steps of:

(a) generating a first sinusoidal signal at a first frequency suitable for inducing tube wave propagation in a borehole;

(b) generating a first phase reference signal representing phase of the first sinusoidal signal;

(c) driving a transducer at a transmitter location in the borehole with said first sinusoidal signal so as to emit sonic energy at said first frequency and thereby induce propagation of tube waves in the borehole;

(d) at each of a plurality of receiver locations spaced apart from one another and from said transmitter location, receiving sonic energy of said tube waves and producing a corresponding receiver signal; and (e) for each said receiver location, operating a phase-sensitive detector responsive to the corresponding receiver signal and to the first phase reference signal to detect a complex pressure response of the received sonic energy of the first frequency.

25. The method of claim 24, further comprising the steps of:

(f) generating a second sinusoidal signal at a second frequency suitable for inducing tube wave propagation in the borehole;

(g) generating a second phase reference signal representing phase of the second sinusoidal signal;

(h) driving said transducer with said second sinusoidal signal so as to emit sonic energy at said second frequency and thereby induce propagation of tube waves in the borehole; and (i) for each said receiver location, operating a phase-sensitive detector responsive to the corresponding receiver signal and to the second phase reference signal to detect a complex pressure response of the received sonic energy of the second frequency.

26. The method of claim 25, further comprising the steps of:

(j) generating a third sinusoidal signal at a third frequency suitable for inducing tube wave propagation in the borehole;

(k) generating a third phase reference signal representing phase of the third sinusoidal signal;

(l) driving said transducer with said third sinusoidal signal so as to emit sonic energy at said third frequency and thereby induce propagation of tube waves in the borehole; and (m) for each said receiver location, operating a phase-sensitive detector responsive to the corresponding receiver signal and to the third phase reference signal to detect a complex pressure response of the received sonic energy of the third frequency.

27. The method of claim 26, further comprising the steps of:

(n) performing steps (a) through (e) during a first time interval to obtain a detected complex pressure response of the received sonic energy of the first frequency;

(o) performing steps (f) through (g) during a second time interval following said first time interval to obtain a detected complex pressure response of the received sonic energy of the second frequency; and (p) performing steps (j) through (m) during a third time interval following said second time interval to obtain a detected complex pressure response of the received sonic energy of the third frequency.

28. The method of claim 24, wherein step (b) comprises continuously driving the transducer with said first sinusoidal signal.

29. The method of claim 24, wherein step (b) comprises driving the transducer with a multi-cycle burst of said first sinusoidal signal of sufficient length to effectively simulate continuous emission of sonic energy at said first frequency.

30. The method of claim 24, wherein step (d) comprises, for each said receiver location, operating a phase-sensitive detector responsive to the corresponding receiver signal and to the first phase reference signal to detect amplitude of the received sonic energy of the first frequency and phase of the received sonic energy of the first frequency in relation to the first phase reference signal.

31. The method of claim 30, further comprising the step of processing the detected amplitudes and phases to determine phase velocity of said tube waves in said borehole.

32. A method of borehole logging, comprising the steps of:

(a) generating a first sinusoidal signal at a first frequency suitable for inducing tube wave propagation in a borehole;

(b) generating a second sinusoidal signal at a second frequency suitable for inducing tube wave propagation in the borehole;

(c) generating a third sinusoidal signal at a third frequency suitable for inducing tube wave propagation in the borehole;

(d) generating a first phase reference signal representing phase of the first sinusoidal signal;

(e) generating a phase reference signal representing phase of the second sinusoidal signal;

(f) generating a phase reference signal representing phase of the third sinusoidal signal;

(g) mixing said first sinusoidal signal, said second sinusoidal signal and said third sinusoidal signal to produce a transmitter signal;

(h) driving a transducer at a transmitter location in the borehole with said transmitter signal so as to emit sonic energy and thereby induce propagation of tube waves in the borehole;

(i) at each of a plurality of receiver locations spaced apart from one another and from said transmitter location, receiving sonic energy of said tube waves and producing a corresponding receiver signal; and (j) for each said receiver location, operating a phase-sensitive detector responsive to the corresponding receiver signal and to the first phase reference signal to detect a complex pressure response of the received sonic energy of the first frequency, operating a phase-sensitive detector responsive to the corresponding receiver signal and to the second phase reference signal to detect a complex pressure response of the received sonic energy of the second frequency, and operating a phase-sensitive detector responsive to the corresponding receiver signal and to the third phase reference signal to detect a complex pressure response of the received sonic energy of the third frequency.

33. The method of claim 32, wherein step (d) comprises, for each said receiver location, operating a phase-sensitive detector responsive to the corresponding receiver signal and to the first phase reference signal to detect amplitude of the received sonic energy of the first frequency and phase of the received sonic energy of the first frequency in relation to the first phase reference signal.

34. A method of borehole logging, comprising the steps of:

(a) generating a transmitter signal having a repetitive signal sequence, the transmitter signal having its energy concentrated at a number of distinct frequencies $f_n$, each of said distinct frequencies $f_n$ being suitable for inducing tube wave propagation in a borehole and being defined by the expression $f_n \leq n/\tau$, where $\tau$ is the period of the repetitive signal sequence and n is an integer;

(b) for each of said distinct frequencies of the transmitter signal, generating a respective phase reference signal representing phase of the distinct frequency within the transmitter signal;

(c) driving a transducer at a transmitter location in the borehole with said transmitter signal so as to emit sonic energy and thereby induce propagation of tube waves in the borehole;

(d) at each of a plurality of receiver locations spaced apart from one another and from said transmitter location, receiving sonic energy of said tube waves and producing a corresponding receiver signal; and (e) for each said receiver location and for each said distinct frequency of the transmitter signal, operating a phase-sensitive detector responsive to the corresponding receiver signal and to the respective phase reference signal to detect a complex pressure response of the received sonic energy of each of said distinct frequencies.

35. The method of claim 34, wherein the period $\tau$ of the repetitive signal sequence is related to the lowest distinct frequency $f_{min}$ of the repetitive signal sequence by the expression $\tau = 1/f_{min}$.

* * * * *